US008663857B2

(12) United States Patent
Jiménez Domínguez et al.

(10) Patent No.: US 8,663,857 B2
(45) Date of Patent: Mar. 4, 2014

(54) PROCESS FOR THE PRODUCTION OF HYDROGEN BY CATALYZED HYDROLYSIS OF A COMPLEX HYDRIDE, AND FACILITY WITH SEMI CONTINUOUS REACTOR FOR CARRYING OUT THE METHOD

(75) Inventors: María de los Ángeles Jiménez Domínguez, Sevilla (ES); María del Mar Jiménez Vega, Sevilla (ES); Belén Sarmiento Marrón, Sevilla (ES); Asunción Fernández Camacho, Sevilla (ES); Gisela Mariana Arzac De Calvo, Sevilla (ES); Enrique Jiménez Roca, Sevilla (ES)

(73) Assignee: Abengoa Hidrogeno, S.A., Sevilla (ES)

( * ) Notice: Subject to any disclaimer, the term of this patent is extended or adjusted under 35 U.S.C. 154(b) by 0 days.

(21) Appl. No.: 13/268,095

(22) Filed: Oct. 7, 2011

(65) Prior Publication Data
US 2012/0156576 A1    Jun. 21, 2012

(30) Foreign Application Priority Data

Dec. 21, 2010  (ES) .................................. 201031899

(51) Int. Cl.
*H01M 8/06*         (2006.01)
(52) U.S. Cl.
USPC ....................................................... 429/416
(58) Field of Classification Search
None
See application file for complete search history.

(56) References Cited

U.S. PATENT DOCUMENTS

2006/0165568 A1   7/2006  Yoshizaki
2007/0264190 A1*  11/2007  Zhang et al. ............... 423/648.1
(Continued)

FOREIGN PATENT DOCUMENTS

EP         1 962 359      8/2008
WO       2009/009853     1/2009

OTHER PUBLICATIONS

Kim et al., Hydrogen generation system using sodium borohydride for operation of a 400W-scale polymer electrolyte fuel cell stack, Journal of Power Sources 170 (2007) 412-418, Available online Apr. 22, 2007.*

(Continued)

*Primary Examiner* — Patrick Ryan
*Assistant Examiner* — Jose Colucci Rios
(74) *Attorney, Agent, or Firm* — Wenderoth, Lind & Ponack, L.L.P.

(57) ABSTRACT

The present invention relates to a process for producing a continuous flow of hydrogen by catalyzed hydrolysis of a complex hydride, which comprises at least adding continuously and at constant rate a fuel solution to a reactor comprising a complex hydride stabilized on a hydroxide on a cobalt boride catalyst that is added in excess inside said reactor. Sodium borohydride is preferably used, the hydroxide is sodium hydroxide and the catalyst is supported on nickel foam. Parameters and optimal conditions to achieve continuous production of hydrogen have been determined, which is essential in the operation of fuel cells. A facility comprising a semi continuous reactor designed to perform the above process, which needs no refrigeration is also an object of the present invention, as well as a washing and reactivation process of a catalyst of the type used in the process mentioned above.

11 Claims, 3 Drawing Sheets

(56) References Cited

U.S. PATENT DOCUMENTS

| | | | |
|---|---|---|---|
| 2009/0017347 A1* | 1/2009 | Damery et al. | 429/19 |
| 2009/0169446 A1* | 7/2009 | Amendola et al. | 422/234 |
| 2009/0196821 A1 | 8/2009 | Palanichamy et al. | |
| 2009/0263687 A1 | 10/2009 | Yoshizaki | |

OTHER PUBLICATIONS

Dai et al., Amorphous cobalt-boron/nickel foam as an effective catalyst for hydrogen generation from alkaline sodium borohydride solution, Journal of Power Sources 177(2008) 17-23, Available online Nov. 17, 2007.*

Lee et al., "A structured Co-B catalyst for hydrogen extraction from $NaBH_4$ solution", Catalysis Today, vol. 120, pp. 305-310, 2007.

G.M. Arzac et al., "Optimized hydrogen generation in a semicontinuous sodium borohydride hydrolysis reactor for a 60 W-scale fuel cell stack", Journal of Power Sources, vol. 196, pp. 4388-4395, 2011.

Spanish Office Action issued Aug. 28, 2012 in corresponding Spanish Application No. 201031899, with partial English translation.

European Search Report issued Jul. 12, 2012 in corresponding European Application No. 11 193 661.3.

J. Delmas et al., "Improved hydrogen storage capacity through hydrolysis of solid $NaBH_4$ catalyzed with cobalt boride", International Journal of Hydrogen Energy, vol. 36 (2011), pp. 2145-2153.

* cited by examiner

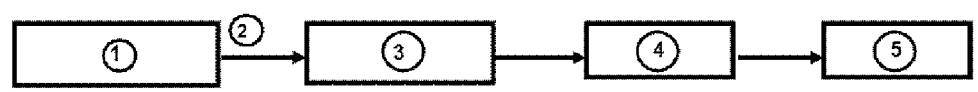
Figure 1.a
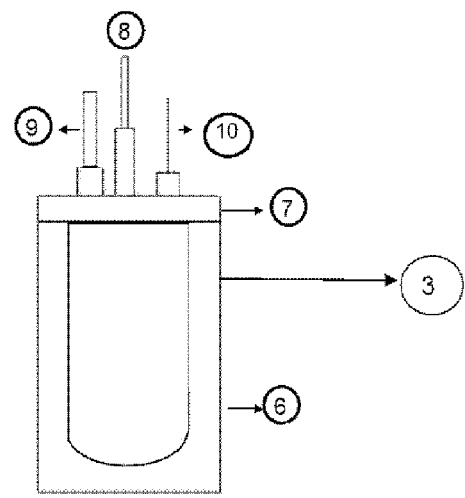
Figure 1.b

| BHS Concentration % w/w | CoB supported (mg) | Fuel addition rate (ml.min⁻¹) | Flow of H₂ (l.min⁻¹) | Total Conversion (%) | c.a. (% w/w) | potential c.a. a) (% w/w) | T (°C) |
|---|---|---|---|---|---|---|---|
| 19 | 675 | 2.5 | 1.16 | 90 | 3.5 | 4 | 60 |
| 19 | 680 | 1.2 | 0.6 | 86 | 3.4 | 4 | 54 |
| 19 | 388 | 0.52 | 0.25 | 82 | 3.3 | 4 | 41 | a) Obtained from Figure 2, for 19% w/w fuel concentration

PROCESS FOR THE PRODUCTION OF HYDROGEN BY CATALYZED HYDROLYSIS OF A COMPLEX HYDRIDE, AND FACILITY WITH SEMI CONTINUOUS REACTOR FOR CARRYING OUT THE METHOD

TECHNICAL FIELD OF THE INVENTION

The present invention falls within the field of generation of hydrogen-rich gas streams by hydrolysis, particularly of hydrides and more particularly complex hydrides, that can be used in hydrogen production plants, combustion engines and, in particular, as fuel in fuel cells systems where optimal results are obtained, more specifically in PEM-type fuel cells.

BACKGROUND OF THE INVENTION

The main obstacles to the use of hydrogen as an energy carrier are the storage, transport, distribution and choosing the ideal system to produce energy through the same. Among the possible systems for producing energy from hydrogen there are fuel cells, such as those of a PEM-type (proton exchange membrane) that function efficiently converting hydrogen (properly provided) and oxygen from the air in energy and water as a by-product, this being environmentally benign. For these reasons, the development of systems capable of efficiently storing and transporting hydrogen is essential in the field.

Hydrogen can be stored in different ways:
i) compressed
ii) liquefied
iii) by adsorption on porous materials processes, and
iv) forming chemical bonds in metal hydrides, complex hydrides or organic compounds.

Among the metal hydrides mentioned in iv) there are a large number of compounds capable of releasing hydrogen by catalyzed hydrolysis. Among these metal hydrides, there are magnesium hydride ($MgH_2$) (M. H. Grosjean, M. Zidoune, I. Roué, J. Y. Huot, Int. J. Hydrogen Energy, 2006, 31,109) and calcium hydride ($CaH_2$) (M. Q. Fan, F. Xu, L. X. Sun, Int. J. Hydrogen Energy, 2007, 32.2809).

Among the complex hydrides mentioned in iv) there are borohydrides such as lithium borohydride ($LiBH_4$) (Y. Kojima, Y. Kawai, M. Kimbara, H. Nakanishi, S. Matsumoto, Int. J. Hydrogen Energy, 2004, 29, 1213), potassium, rubidium and cesium borohydrides ($KBH_4$, $RbBH_4$, $CsBH_4$ respectively) (C. Cakanyildirim, M. Gürü, Int. J. Hydrogen Energy 33, 2008, 4634-4639) and sodium borohydride ($NaBH_4$).

Among the hydrides capable of releasing hydrogen by a hydrolysis reaction, sodium borohydride (BHS) has been widely studied due to its high content of hydrogen and its great stability in basic solutions at room temperature. Recent reviews include a wide literature on it (B. H. Liu, Z. P. Li, J. Power Sources 187, 2009, 527-534; U. B Demirci, O. Akdim, J. Andrieux, J. Hannauer, R. Chamoun, P. Miele, Fuel Cells 3, 2010, 335-350). It is known that hydrogen free of carbon monoxide can be obtained by hydrolysis of alkaline solutions of BHS in the presence of certain catalysts using the following equation:

$$NaBH_4 + (2+X)H_2O \rightarrow NaBO_2 \cdot XH_2O + 4H_2 + Q \quad (1)$$

wherein X=2-4
(H. I. Schlesinger, H. C. Brown, A. E. Finholt, J. R. Gilbreath, H. R. Hoekstra, E. K. Hyde, J. Am. Chem. Soc, 75, 1953, 215-219; J. C Walter, A. Zurawski, D. Montgomery, M. Thornburg, S. Revankar, J. Power Sources 179, 2008, 335-339).

To catalyze these types of reactions, the cobalt boride is a known catalyst and not as expensive as precious metals (C. Wu, F. Wu, Y. Bai, B. Yi, H. Zhang, Materials Letters 59, 2005, 1748-1751). For certain applications, it is preferred to support the catalyst on suitable supports like Ni foam (J. Lee, K. Y. Kong, C. R. Jung, E. Cho, S. P Yoon, J. Han, T. G Lee, S. W. Nam, Catalysis Today 120, 2007, 305-310). The recent literature contains a large number of examples of systems for hydrogen production by catalyzed hydrolysis of sodium borohydride (S. J. Kim, J. Lee, K. Y. Kong, C. R Jung, I. G Min, S. Y. Lee, H. J. Kim, S. W. Nam, T. H. Lim, J. Power Sources 170, 2007 412-418; P. P. Prosini, P. Gilson, J. Power Sources 161, 2006, 290-293; D. Gervasio, S. Tasic, F. Zenhausern., J. Power Sources 149, 2005, 15-21; R. Oronzio, G. Monteleone, A. Pozio, M. De Francesco, S. Galli, Int. J. Hydrogen Energy 34, 2009, 4555-4560; Q. Zhang, G. M. Smith, Y. Wu. Int. J. Hydrogen Energy 32, 2007, 4731-4735). For any design capable of producing hydrogen based on catalyzed hydrolysis of a complex hydride, such as it may be preferably sodium borohydride, that wants to adapt to a fuel cell is critical to ensure a hydrogen production at constant rate, at a value that will depend on the conditions of the same (power and voltage). Given the exothermic nature of the reaction (equation (1)), the constancy of rate requires the environment in which the reaction proceeds to be as isothermal as possible (B. H. Liu, Z. P. Li, S. Suda, J. Alloys and Comp. 468 (2009) 493-493). The temperature control can be achieved with a suitable system/reactor design. Said design may vary from a simple cooling of the reactor to the continuous flow of reactants and products as a means of removing the heat generated during the reaction (S. J. Kim, J. Lee, K. Y. Kong, C. R Jung, I. G Min, S. Y. Lee, H. J. Kim, S. W. Nam, T. H. Lim, J. Power Sources 170, 2007, 412-418).

To optimize the conditions for hydrogen production, the total conversion of the BHS and the gravimetric storage capacity of the fuel+catalyst system should be maximized. While the literature provides examples where high values of hydrogen gravimetric storage capacity are obtained (B. H. Liu, Z. P. Li, S. Suda, J. Alloys and Compd. 468, 2009, 493-493; D. Hua, Y. Hanxi, A. Xinping, C. Chuansin, Int. J. Hydrogen Energy 28, 2003, 1095-1100; Y. Kojima, Y. Kawai, H. Nakanishi, S. Matsumoto, J. Power Sources 135, 2004, 36-41), these systems do not produce hydrogen at a constant rate, which is considered highly necessary for the fuel cell.

In regard to the devices commonly used for hydrogen production, some reviewed patent applications describe systems based on the catalyzed hydrolysis of sodium borohydride at high pressures (Hou, X CN101397124-A; Jorgensen SW, US 2004052723-A1; Toyota Chuo Kenkyusho KK, JP2003004199-A), implying that the hydrogen produced must be properly dispensed through a valve, having problems as it is dispensed due to the pressure drop. This obviously affects the production of hydrogen at a constant rate.

As for the catalysts used in the production of energy using hydrogen in fuel cells, according to a 2010 review (U. B Demirci, O. Akdim, J. Andrieux, J. Hannauer, R. Chamoun, P. Miele, Fuel Cells 3, 2010, 335-350) in recent years papers have been published that maximize the activity of said catalysts, but there are little activity data in experiments of long duration, or on the possibility to reuse the catalyst several times.

To solve these problems encountered in the field, the present invention proposes a process of continuous production of hydrogen at constant rate and temperature, based on adding a source of hydrogen as a complex hydride that acts as fuel, preferably sodium borohydride, stabilized in a hydroxide solution, preferably sodium hydroxide, over a cobalt boride (CoB) catalyst, preferably supported on nickel foam. The control of the reaction temperature and rate in this process, which as mentioned are critical to optimize the conditions for hydrogen production is based on controlling the rate of addition or aggregation of the fuel solution to the catalyst. It is also essential to consider the concentration of the hydride in the stabilized solution used as fuel.

Based on theoretical considerations, the present invention has optimized the production of $H_2$ controlling both conditions, concentration of the complex hydride in the fuel solution and the rate of addition of the same, under conditions of excess catalyst, so that it has managed to maximize the total conversion of the complex hydride, especially in the case of sodium borohydride, into $H_2$ and the gravimetric storage capacity of the fuel+catalyst system with constant rates of production of hydrogen, said rates being adapted to the fuel cell, preferably of PEM-type to which hydrogen is intended.

On the other hand, the invention proposes a hydrogen production facility comprising a device, a semi continuous reactor, very simple in design and that can be built with lightweight materials, having portable applications in mind. Some works previously disclosed in the field of industrial protection (Wang Y, CN1458059-A; Jorgensen SW, US 2004052723-A1; and Braun J, WO 2009086541-A1) include additional components in the design for temperature and agitation control, which makes the device a more complex system. None of the known documents proposes to maximize the conversion of the hydride or the gravimetric storage capacity of the fuel-catalyst system simultaneously with the production of hydrogen at a constant rate.

In addition, we propose here a novel method and not reported so far to reactivate the CoB catalyst, preferably supported on nickel foam, for subsequent reuse thereof several times in the process of hydrogen production. This method is based on two fundamental steps or stages: i) washing and ii) chemical reactivation. Other methods of reactivation proposed in the literature include a single washing step (J. H. Kim, K. T. Kim, Y. M Kang, H. S. Kim, M. S. Song, Y. J. Lee, P. S. Lee, J. Y. Lee, J Alloys and Compd. 379, 2004, 222-227 and U. B. Demirci, F Garin, J Alloys and Compd., 2208, 5, 1), but washing as the only step does not allow recovering the catalyst activity that has long been used and stored without further care. The step of chemical reactivation allows the reuse of the catalyst that has already been used and left in the highly corrosive reaction mean for several months, which is a further innovation of the present invention.

DESCRIPTION OF THE INVENTION

General Description

The main object of the present invention consists of a process for the controlled production of hydrogen from the catalyzed hydrolysis of a complex hydride, preferably sodium borohydride (according to the equation (1) set forth in the previous section), over a wide range of rates and under optimized conditions to maximize process performance and storage capacity by weight and controlling the flow of hydrogen production on demand. Thus, the optimization for minimized response times is raised.

Another object of the present invention is to design a facility for the optimized production of $H_2$ under constant conditions of flow, according to the aforementioned method, characterized in that it comprises a semi continuous reactor that does not require cooling system. The developed device is chemically stable and safe before, during and after the operation, and as it has been said its main advantage is that it is not temperature controlled, i.e. it does not require refrigeration.

The hydrogen obtained in this way could feed a hydrogen production plant or a combustion engine, although the hydrogen production process of the present invention is preferably designed to feed a fuel cell, preferably of the PEM type, to produce electricity.

Likewise, the present invention encompasses the development of a method of reactivation and reuse of a cobalt boride catalyst that is used in hydrolysis processes of complex hydrides, such as it is the case of the present invention.

Detailed Description

The present invention relates to a process for producing a continuous flow of hydrogen through catalyzed hydrolysis of a complex hydride, comprising at least the stage of adding a fuel solution is added to a reactor at a constant rate, said solution comprising a complex hydride stabilized on hydroxide on a cobalt boride catalyst; said catalyst being added in excess inside said reactor. The complex hydride is present in the fuel solution in a concentration comprised between 7 and 21% w/w including both limits, the addition of the fuel solution over the catalyst being carried out at a rate comprised between 1.5 ml/minute and 5 ml/minute including both limits, the excess amount of the catalyst being comprised between 408 mg and 725 mg including both limits, and the temperature being comprised between 42° C. and 65° C. including both limits. In this way the main objective of the invention is achieved, which is to produce a continuous flow of hydrogen that serves as a fuel source to other devices such as a combustion engine but preferably a fuel cell, since in this case the continuous contribution of a flow of hydrogen is essential for its operation.

Preferably, the excess amount of the catalyst between 458 and 675 mg is added, including both limits, to achieve the generation of a continuous flow of hydrogen within the reactor. Also preferably, the concentration of hydride in the fuel solution is comprised between 9% and 19% w/w including both limits, adding said solution over the catalyst at a rate comprised between 2.5 and 4 ml/min, including both limits.

If the previous preferred features are integrated in a single embodiment of the invention (i.e., if the concentration of hydride in the fuel solution is comprised between 9% and 19% w/w including both limits; the addition of said solution over the catalyst is carried out at a rate comprised between 2.5 and 4 ml/min, including both limits; and the excess amount of catalyst is comprised between 458 and 675 mg, including both limits) and the temperature is regulated to be comprised between 47° C. and 60° C., including both limits, then producing a continuous flow of hydrogen comprised between 0.25 and 1 liter/minute is achieved.

Preferably, in either case or variants herein, the complex hydride is sodium borohydride. It has been shown that the optimum values of hydrogen production are achieved with sodium borohydride (BHS) as a hydrogen source, following equation (1) set forth in this specification.

Also in a preferred manner, the solution that acts as fuel with which the complex hydride is stabilized is sodium hydroxide. More preferably, the solution is sodium hydroxide 4.5% w/w (in percent by weight of the solution).

As for the catalyst of cobalt boride (CoB), it is preferably supported on nickel foam.

The reactor is semi continuous.

In one of the most preferred embodiments of the invention, the process of hydrogen production by hydrolysis comprises at least adding in a semi continuous reactor a solution comprising sodium borohydride stabilized in sodium hydroxide 4.5% w/w solution, over a cobalt boride catalyst supported on nickel foam.

Of all the embodiments that comprise this invention, the most preferred would consist of a process for producing a continuous flow of hydrogen by catalyzed hydrolysis of a complex hydride, comprising at least the stage of:

adding continuously and at a constant rate to a semi continuous reactor a fuel solution comprising sodium borohydride at a concentration comprised between 9% and 19% w/w including both limits, stabilized on sodium hydroxide at 4.5% by weight of solution, over a boride cobalt catalyst supported on nickel foam that is added in excess into said reactor in an amount comprised between 458 and 675 mg, including both limits;

adding the fuel solution at a rate comprised between 2.5 and 4 ml/min, including both limits, and the temperature in the reactor being comprised between 47° C. and 60° C., including both limits.

The main advantage of the process presented here is to optimize the conversion of the complex hydride and maximize the gravimetric storage capacity to achieve the production of hydrogen at a constant rate and controlled temperature by controlled addition of the stabilized solution of the complex hydride, which is preferably BHS, according to theoretical calculations.

Under conditions of constant temperature and constant flow of hydrogen, optimizing both the performance and the storage capacity of hydrogen is achieved by choosing the aggregation rate of the fuel solution and the concentration of the complex hydride in the same in suitable values, such as those shown for the preferred embodiments of the examples illustrated in FIG. 4. This methodology is based on theoretical considerations, including the boundary conditions of the reaction.

When working with solutions of complex hydride as a fuel, more preferably when it comes to sodium borohydride, the hydrogen storage capacity is a property of the solution, as long as a 100% conversion of the complex hydride is reached. Under these conditions, the hydrogen storage capacity of the system varies with the concentration of complex hydride, as shown in FIG. 2 for sodium borohydride. The concentration of the complex hydride in the fuel solution is limited by the solubility of it, being in the case of sodium borohydride 35.5% w/w, and also the hydrolysis product contains hydration water ($NaBO_2XH_2O$; equation (1)), both effects limiting the theoretical storage capacity of hydrogen to 7.3% w/w when the process is performed with sodium borohydride.

The key for the total conversion of the complex hydride added to the reactor as fuel in the hydroxide solution is the contribution to the reactor of an amount of cobalt boride catalyst in excess. Then, the optimization of hydrogen storage capacity is achieved, in excess of catalyst, by adding, for each concentration of the complex hydride in the fuel solution, the solution volume per minute as to provide the stoichiometric amount of the complex hydride to produce a desired hydrogen amount per minute.

There is a further limitation for the concentration of the complex hydride in the fuel solution, determined by the solubility of the hydrolysis product ($NaBO_2XH_2O$, equation (1) for the case of sodium borohydride). The precipitation prevents the production of hydrogen under the conditions required for the fuel cell, particularly on those the PEM type. This limit is found for the 16% w/w BHS solution at room temperature and can be extended if the reaction temperature is higher.

These theoretical considerations give rise to the concentration ranges of the complex hydride (preferably sodium borohydride) solution, addition rate of the solution and amount of catalyst described above at the beginning of the section "Detailed description".

In a particular embodiment of the invention described, that can include any of the preferences outlined above, the process further comprises stabilizing the complex hydride in the fuel solution comprising the hydroxide, prior to the addition of the fuel solution over the catalyst:

In another particular embodiment, that includes any of the above, the process comprises:

extracting from the reactor the hydrogen stream obtained by hydrolysis and directing it to the washing means.

The hydrogen stream can be washed or not, a particular embodiment of the process also comprises directing the flow of hydrogen continuously and at constant rate to a fuel cell. Preferably, the fuel cell is PEM.

Another object of the present invention consists of the reactivation and reuse of a cobalt boride catalyst that is used in the processes of hydrolysis of complex hydrides, such as it may be the process set forth herein, as the reaction product (for example, in the case of borohydride, $NaBO_2XH_2O$, equation (1)) is deposited over the cobalt boride catalyst throughout the process, and once the addition of fuel solution to the catalyst surface ends, is hydroxylated to form inactive $Co(OH)_2$ (see equation (2)):

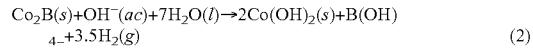

$$Co_2B(s)+OH^-(ac)+7H_2O(l)\rightarrow 2Co(OH)_2(s)+B(OH)_4^-+3.5H_2(g) \qquad (2)$$

For these reasons, a method for reactivating the catalyst for its subsequent reuse is proposed here, based on the following equation (3):

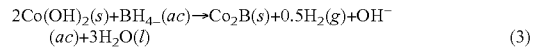

$$2Co(OH)_2(s)+BH_4^-(ac)\rightarrow Co_2B(s)+0.5H_2(g)+OH^-(ac)+3H_2O(l) \qquad (3)$$

The method for reactivation and reuse of the catalyst is characterized in that it comprises the following steps:

extracting the cobalt boride catalyst used in the hydrolysis reaction and washing it at least twice with purified water, immersing the catalyst in a solution comprising the complex hydride used in the hydrolysis reaction, such as it may be sodium borohydride in the case of this invention, in a ratio comprised between 8 w/w and 14 w/w for a time comprised between 5 and 10 minutes; and washing again the catalyst in purified water at least once.

Preferably, this process is applied at least once over the catalyst, although it may be carried out at least 5 times over the same catalyst without losing efficiency in the catalytic activity or the degree of conversion of the BHS solution (see FIG. 4).

Washing the catalyst releases the surface of the same from debris of the reaction product, such as it may be the $NaBO_2XH_2O$ when using sodium borohydride. As mentioned above, then the washed catalyst is introduced into a solution of the complex hydride used in the hydrolysis reaction, such as sodium borohydride in the present invention in order to convert the surface $Co(OH)_2$ into CoB, which is active again, according to the equation (3).

This catalyst recovery protocol must be done prior to using the same, considering that since the last use of the catalyst can pass up to several months.

It is also an object of the present invention a production facility of a hydrogen stream in accordance with the process described above, in any of its variants. Said facility comprises at least the following elements, which are presented graphically in FIG. 1a to better illustrate an embodiment of the invention, without said figure limiting the same in its most generic form:

a storage tank (1) of the fuel solution comprising the complex hydride stabilized by a hydroxide;
dispensing means (2) of the fuel solution at constant flow into the reactor;
an unrefrigerated semi continuous reactor (3);
washing means (4) of the hydrogen stream; and
dispensing means (5) of the hydrogen stream to a fuel cell.

The facility is characterized in that the unrefrigerated semi continuous reactor (3) is comprised at least by:

a body (6);
a lid (7) with opening and closing;
an inlet (8) of the fuel solution to the body (6); and
an outlet (9) of the hydrogen stream.

Both the fuel tank (1) as the semi continuous reactor (3) can be built with plastic materials, thus minimizing the weights according to the system operating conditions (hydrogen flow, time, concentration of the fuel solution . . . ).

Optionally, said semi continuous reactor (3) may comprise a thermocouple (10) for the simultaneous measurement of temperature.

The most unique feature of the semi continuous reactor described here is that it is not refrigerated.

A scheme of a particular embodiment of the semi continuous reactor (3) is shown in FIG. 1b, showing the simplicity of it. The reactor (3) can directly dispense the constant flow required for a fuel cell, which is preferably PEM type.

As mentioned, with the continuous addition of the fuel solution to the reactor, controlling the rate and temperature of hydrogen production is achieved, thus being able to dispense with the described installation of additional heating and/or cooling systems of the reactor and with agitation methods, since the latter is achieved by the own bubbles of the hydrogen formed in the reactor. The reactor starts to release hydrogen with the first drops of fuel solution added containing the complex hydride, and once it enters into regime (2-5 minutes induction) it does it in a stable and secure manner for all the time the addition of the fuel lasts (see FIG. 3) until the addition stops or because the reactor itself is completely filled.

DESCRIPTION OF THE FIGURES

With the object of contributing to a better understanding of the invention, and according to a practical embodiment thereof, is attached as an integral part of this description a series of figures where, with an illustrative character and in no way limiting the invention, the following has been represented:

FIG. 1a. Scheme of the hydrogen production facility using the process described herein, comprising the following elements:

Figure 2:
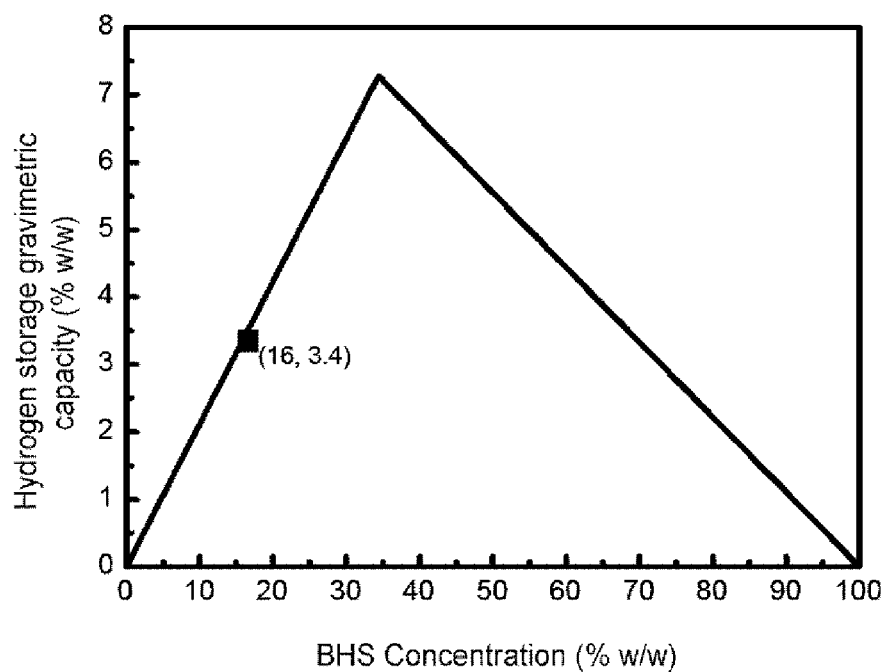

storage tank (1) of the fuel solution;
dispensing means (2) of the fuel solution within the reactor;
unrefrigerated semi continuous reactor (3);
washing means (4) of the hydrogen stream; and
dispensing means (5) of the hydrogen stream to a fuel cell.

FIG. 1.b-. Scheme of the semi continuous reactor (3) of FIG. 1.a., comprising the following elements:

cylindrical body (6) with conical bottom;
lid (7) with opening and closing;
inlet (8) of the fuel solution to the body (6);
outlet (9) of the hydrogen stream;
thermocouple (10) (optional).

FIG. 2-. Graphic representation of the variation of the gravimetric storage capacity of hydrogen with respect to the concentration of the solution of complex hydride (BHS), in conditions of total conversion of the hydride.

Figure 3:
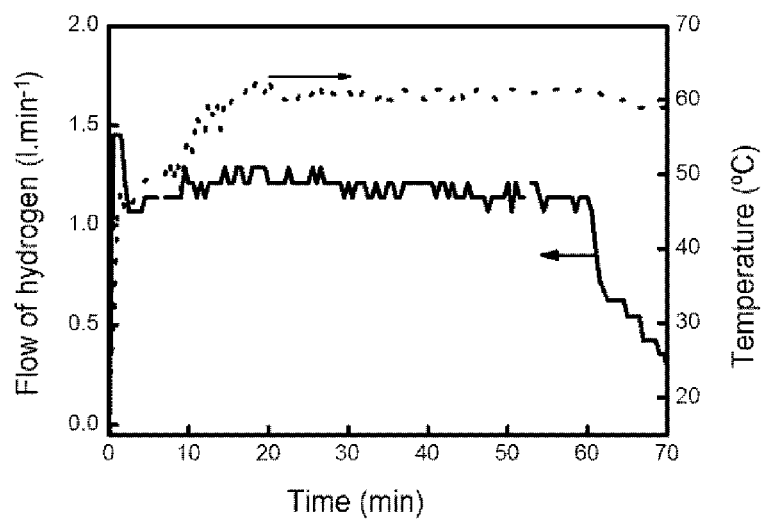

FIG. 3-. Graphic representation of the flow of hydrogen (solid line) and temperature (dashed line) versus time for the production of 1.16 liters/minute of hydrogen for an hour, feeding a 60 W PEM-type fuel cell during that time, according to one of the examples of embodiment.

Figures 4, 5:
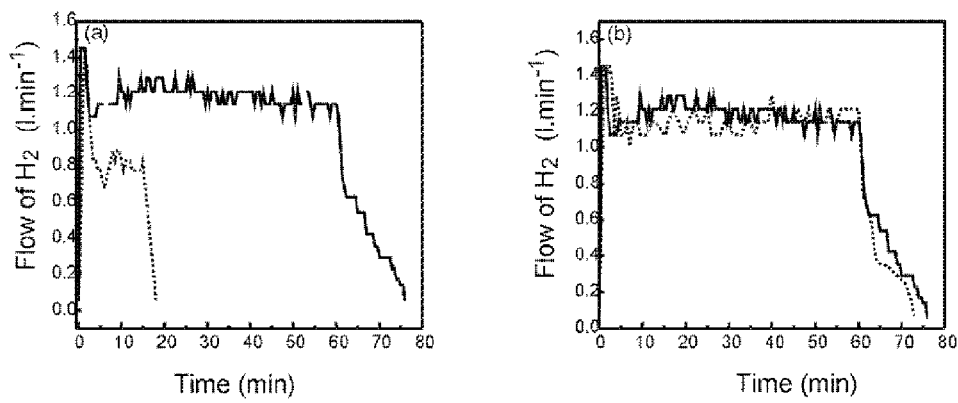

FIG. 4-. Table comparing the conditions and the results of FIG. 3 with those of another preferred embodiment illustrated in the examples that consists of producing 0.25 liters/minute and 0.6 liters/minute of hydrogen for an hour, to feed a 15 W and 36 W PEM-type fuel cell respectively during that time.

FIG. 5-. Graphic representation of the hydrogen flow versus time for the washing and reactivation of the catalyst process, which represents:

5.a-. Reactivation exclusively by washing (dotted line) compared with the example of production of 1.16 liters/minute of hydrogen (solid line);

5.b-. Complete reactivation (dotted line) compared with the same example cited (solid line).

EXAMPLES OF EMBODIMENT OF THE INVENTION

Example 1-. Preparation of a Cobalt Boride (CoB) Catalyst Supported on Nickel Foam The supported CoB catalyst was prepared by reduction of $CoCl_2.6H_2O$ in aqueous medium by $NaBH_4$ stabilized in NaOH. The support chosen for the catalyst is nickel foam 1.6 mm thick, 95% porosity.

All solutions were prepared using MilliQ® purified water. Prior to synthesis, the support was cut into rectangles of 1 cm×2 cm and weighed. Then it was sonicated (i.e. subjected to the action of ultrasound) for 10 min in ethanol and 10 min in acetone for cleaning. Then it was immersed into 10% HCl for 10 min and washed with MilliQ® water. The support thus clean was immersed in a 30 wt % $CoCl_2.6H_2O$ solution for 10 seconds and then for another 10 seconds in a BHS 20% solution in 1% NaOH cooled in an ice bath. Then the obtained product was washed several times. The cycle was repeated 12 times.

To increase the adhesion of the catalyst to the support without losing catalytic activity it was subjected to heat treatment for 2 hours in an He atmosphere at 573K (1 K/min).

EXAMPLE 2-. Process According to the Present Invention to Produce 1.16 Liters/Minute of Hydrogen for 1 Hour, Under Conditions to Feed a 60 W PEM-Type Fuel Cell During that Time, from the Hydrolysis of Sodium Borohydride in the Sodium Hydroxide Solution Over a Catalyst Such as the One from the Previous Example To produce 1.16 liters/minute of hydrogen the BHS solution stabilized with a concentration of 19% w/w in it was selected. Said solution has associated a maximum gravimetric hydrogen storage capacity of 4%. To work in conditions of total conversion of BHS, an excess of CoB supported on nickel foam (675 mg catalyst) is added and to optimize the storage capacity of hydrogen a fuel addition rate of 2.5 ml/minute is selected (therefore dispensing an amount of BHS per minute such that in conditions of total conversion it would produce 1.3 liters/minute of hydrogen). Under these conditions a total conversion of the 90% BHS is achieved and a gravimetric storage capacity of hydrogen of 3.5%. The system temperature stabilizes at about 60° C. after the first 20 minutes and remains so during the addition of BHS, the hydrogen flow is stabilized 2 minutes after the reaction has started (see FIG. 3)).

Example 3-. Process According to the Present Invention to Produce 0.6 Liters/Minute and 0.25 Liters/Minute of Hydrogen for 1 Hour, Under Conditions to Feed a 15 W and 36 W PEM-Type Fuel Cell Respectively During that Time Experimental embodiments were also made under conditions to produce 0.6 liters/minute and 0.25 liters/minute of hydrogen for 1 hour. The selected conditions are shown in the table included in FIG. 4 compared to the conditions employed in Example 2. The results obtained of hydrogen production rate with optimization of BHS conversion and gravimetric storage capacity are also reflected in FIG. 4.

Example 4-. Washing and Reactivation Process of the Catalyst of Example (1) Through the Reactivation Protocol Proposed in the Present Invention, and its Reuse in the Process of Example (2)

To reuse the catalyst of Example 1 and that is used in the process of Example 2, stored for 6 months in the open air without any special care, the reactivation protocol described below is carried out.

The catalyst is washed with MilliQ® water several times and then is immersed in a solution of 9% w/w BHS in 4.5% w/w NaOH for 15 minutes. After that time, the catalyst is washed again several times and is proceeded to be used again under the conditions described in the Example 2. This method is performed up to a total of 5 times and the results are equivalent to those obtained in the Example 2.

To demonstrate that the methods previously reported in the literature, consisting exclusively of washing the catalyst, are not sufficient to reactivate a catalyst under aggressive storage conditions as those used in the experiments described here, FIG. 5 shows the results obtained with the complete reactivation (5.b) proposed here, compared to a reactivation exclusively by washing (5.a), each compared with the original response of the catalyst in the process of Example 2.

The invention claimed is:

1. Process for producing a continuous flow of hydrogen by catalyzed hydrolysis of a complex hydride, characterized in that it comprises at least the following step:
   adding at a constant rate to a semi continuous reactor a fuel solution comprising a complex hydride stabilized on a hydroxide, over a cobalt boride catalyst that is added in excess to said reactor, the complex hydride being present at the fuel solution at a concentration comprised between 7% and 21% w/w including both limits, the addition of said fuel solution over the catalyst being carried out at a rate comprised between 1.5 ml/min and 5 ml/min including both limits, the excess amount of the catalyst being comprised between 408 mg and 725 mg including both limits, and the temperature being comprised between 42° C. and 65° C. including both limits.

2. Process according to claim 1, characterized in that the complex hydride is present in the fuel solution in a concentration comprised between 9% and 19% w/w including both limits, the addition of said fuel solution over the catalyst is carried out at a rate comprised between 2.5 ml/min and 4 ml/min including both limits, the excess amount of catalyst is comprised between 458 and 675 mg including both limits, and the temperature is comprised between 47° C. and 60° C. including both limits.

3. Process according to claim 1, characterized in that the complex hydride is sodium borohydride.

4. Process according to claim 1, characterized in that the solution that acts as fuel with which the complex hydride is stabilized is sodium hydroxide.

5. Process according to claim 4, characterized in that the solution is sodium hydroxide 4.5% by weight of the solution.

6. Process according to claim 1, characterized in that the cobalt boride catalyst is supported on nickel foam.

7. Process according to claim 1, characterized in that it comprises, prior to the addition of the fuel solution over the catalyst, the step of stabilizing the complex hydride in the fuel solution comprising the hydroxide.

8. Process according to claim 1, characterized in that the process comprises extracting from the semi continuous reactor the hydrogen stream obtained by hydrolysis and directing it to the washing means.

9. Process according to claim 1, characterized in that it comprises directing the hydrogen stream obtained by hydrolysis to a fuel cell continuously and at constant rate.

10. Process according to claim 9, characterized in that the fuel cell is PEM.

11. Process according to claim 1, wherein it further comprises washing and reactivating the cobalt boride catalyst used in the process, according to the following steps:
   extracting from the semi continuous reactor the cobalt boride catalyst used in the hydrolysis and washing it at least twice with purified water,
   immersing the catalyst in a solution comprising the complex hydride used at a ratio comprised between 8 w/w and 14 w/w for a time comprised between 5 and 10 minutes; and
   washing again the catalyst in purified water at least once.

* * * * *